(12) United States Patent
Doheny et al.

(10) Patent No.: US 11,010,705 B2
(45) Date of Patent: May 18, 2021

(54) PROVIDING OPERATOR FEEDBACK DURING OPERATION OF AN INDUSTRIAL MACHINE

(71) Applicant: JOY GLOBAL SURFACE MINING INC, Milwaukee, WI (US)

(72) Inventors: Ted Doheny, River Hills, WI (US); Daniel Schlegel, Germantown, WI (US); Matthew J. Reiland, Mequon, WI (US); Nicholas R. Voelz, West Allis, WI (US); Jason Knuth, Brookfield, WI (US); Anthony Reid, Whitefish Bay, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 1149 days.

(21) Appl. No.: 15/406,297

(22) Filed: Jan. 13, 2017

(65) Prior Publication Data
US 2017/0200109 A1 Jul. 13, 2017

Related U.S. Application Data (60) Provisional application No. 62/278,141, filed on Jan. 13, 2016.

(51) Int. Cl.
*G06Q 10/06* (2012.01)
*G07C 3/12* (2006.01)

(52) U.S. Cl.
CPC ......... *G06Q 10/06398* (2013.01); *G07C 3/12* (2013.01)

(58) Field of Classification Search
None
See application file for complete search history.

(56) References Cited

U.S. PATENT DOCUMENTS

| | | | | |
|---|---|---|---|---|
| 7,765,039 | B1 * | 7/2010 | Hagenbuch | G07C 5/085 |
| | | | | 701/32.2 |
| 2003/0036817 | A1 * | 2/2003 | Morley | E02F 9/205 |
| | | | | 700/245 |
| 2005/0081410 | A1 * | 4/2005 | Furem | G05B 19/41875 |
| | | | | 37/379 |
| 2005/0278055 | A1 | 12/2005 | Ferguson et al. | |

(Continued)

FOREIGN PATENT DOCUMENTS

| | | | | |
|---|---|---|---|---|
| CN | 101730773 A | 6/2010 | | |
| WO | WO-2006028938 A1 * | 3/2006 | ............. | E02F 9/205 |

(Continued)

OTHER PUBLICATIONS

Cheng, T., et al. "Performance evaluation of ultra wideband technology for construction resource location tracking in harsh environments." Automation in Construction 20.8 (2011): 1173-1184. (Year: 2018).*

(Continued)

*Primary Examiner* — Matthew S Gart
*Assistant Examiner* — Derick J Holzmacher
(74) *Attorney, Agent, or Firm* — Michael Best & Friedrich LLP (57) ABSTRACT

Systems and methods for providing feedback to an operator of an industrial machine. One system includes a controller including an electronic processor. The electronic processor is configured to monitor at least one operating parameter of the industrial machine, determine a plurality of performance metrics based on the at least one operating parameter, and select a subset of the plurality of performance metrics based on a selection criterion. The electronic processor is also configured to display the subset of the plurality of performance metrics to an operator of the industrial machine during operation of the industrial machine.

19 Claims, 3 Drawing Sheets

(56) References Cited

U.S. PATENT DOCUMENTS

| | | | | |
|---|---|---|---|---|
| 2006/0090379 A1* | 5/2006 | Furem | ............... | E02F 9/267 |
| | | | | 37/443 |
| 2007/0282577 A1* | 12/2007 | Lind | ............... | G06F 30/20 |
| | | | | 703/6 |
| 2008/0201108 A1* | 8/2008 | Furem | ............... | G05B 19/0428 |
| | | | | 702/182 |
| 2009/0018718 A1* | 1/2009 | Lang | ............... | G06Q 10/06 |
| | | | | 701/31.4 |
| 2010/0189466 A1 | 7/2010 | Otani | | |
| 2010/0306001 A1 | 12/2010 | Discenzo et al. | | |
| 2011/0282626 A1* | 11/2011 | Rikkola | ............... | G05B 23/02 |
| | | | | 702/179 |
| 2012/0191431 A1* | 7/2012 | Dunbabin | ............... | E02F 9/265 |
| | | | | 703/6 |
| 2012/0263566 A1* | 10/2012 | Taylor | ............... | E02F 7/04 |
| | | | | 414/694 |
| 2012/0277959 A1* | 11/2012 | Colwell | ............... | E02F 3/304 |
| | | | | 701/50 |
| 2013/0197737 A1* | 8/2013 | Malayappalayam Shanmugam | ............... | E02F 3/30 |
| | | | | 701/29.1 |
| 2013/0226317 A1 | 8/2013 | Vijayaraghavan et al. | | |
| 2014/0277235 A1 | 9/2014 | An et al. | | |
| 2015/0064668 A1 | 3/2015 | Manci et al. | | |
| 2016/0194850 A1* | 7/2016 | Taylor | ............... | E02F 3/435 |
| | | | | 701/50 |

FOREIGN PATENT DOCUMENTS

| | | | | | |
|---|---|---|---|---|---|
| WO | WO-2006028966 A1 * | 3/2006 | ............... | E02F 3/434 |
| WO | WO-2011143455 A1 * | 11/2011 | ............... | G05B 23/02 |
| WO | 2014/191579 | 12/2014 | | |

OTHER PUBLICATIONS

Parker, Niall R., S. E. Salcudean, and Peter D. Lawrence. "Application of force feedback to heavy duty hydraulic machines." [1993] Proceedings IEEE International Conference on Robotics and Automation. IEEE, 1993. (Year: 1993).*

Bradley, David A., and Derek W. Seward. "The development, control and operation of an autonomous robotic excavator." Journal of Intelligent and Robotic Systems 21.1 (1998): 73-97. (Year: 1998).*

Lawrence, Peter D., et al. "Coordinated and force-feedback control of hydraulic excavators." Experimental robotics IV. Springer, Berlin, Heidelberg, 1997. 181-194. (Year: 1997).*

Examiner's Report from the Chilean Patent Office for Application No. 201801922 dated Dec. 16, 2019 (13 pages including English summary).

PCT/US2017/13490 International Search Report and Written Opinion of the International Searching Authority dated Jun. 6, 2017 (16 pages).

Office Action issued by the Chinese Patent Office for Application No. 201780009619.0 dated May 27, 2020 (19 pages including English summary).

Chilean Patent Office Examiner's Report for Application No. 201801922 dated Apr. 15, 2020 (17 pages including English summary letter).

Chinese Patent Office Second Office Action for Application No. 201780009619.0 dated Jan. 21, 2021 (19 pages including English summary).

* cited by examiner

PROVIDING OPERATOR FEEDBACK DURING OPERATION OF AN INDUSTRIAL MACHINE

RELATED APPLICATIONS

This application claims benefit of U.S. Provisional Patent Application No. 62/278,141, filed Jan. 13, 2016, the content of which is incorporated by reference herein.

FIELD

Embodiments of the present invention relate to operating industrial machines, such as mining shovels, and, in particular, relate to providing feedback to an operator during operation of an industrial machine.

SUMMARY

During operation, operators of industrial machines generally only receive feedback from an onboard trainer or from a mine dispatch system that both convey instructions (verbal or written) manually specified by other personnel. Thus, this feedback is very subjective and is only as good as the individual providing the feedback. Furthermore, the individual providing the feedback may not be aware of all of the conditions faced by the operator, which may render the feedback inaccurate. For example, many conditions faced by an operator are not easily observed visually. Therefore, an individual providing feedback based solely on his or her visual observations may not be able to provide accurate feedback to an operator. Furthermore, even if an operator receives feedback at the end of the operator's shift, the feedback is generally limited to whether the operator satisfied the planned performance (for example, production) for the shift and is seldom useful to the operator for improving future operation of the industrial machine because the feedback is not provided while the operator operates the industrial machine.

Accordingly, embodiments of the invention provide methods and systems for providing feedback to an operator of an industrial machine during operation of the industrial machine in real-time as the operator is operating the industrial machine. For example, one embodiment of the invention provides a system for operating an industrial machine. The system includes a controller having an electronic processor. The electronic processor is configured to repeatedly monitor current operating parameters of the industrial machine during operation of the industrial machine, repeatedly determine a plurality of performance metrics based on the current operating parameters, repeatedly select a set of the plurality of performance metrics based on selection criteria, and repeatedly display the set of the plurality of performance metrics to an operator of the industrial machine. In some embodiments, the selection criteria includes a threshold for one of the plurality of performance metric, and the electronic processor is configured to select the one of the plurality of performance metrics for inclusion in the set of the plurality of performance metrics when the one of the plurality of performance metrics fails to satisfy the threshold.

Another embodiment of the invention provides a method of operating an industrial machine. The method includes (a) monitoring operating parameters of the industrial machine during operation of the industrial machine, (b) determining, with an electronic processor, a plurality of performance metrics based on the operating parameters, (c) selecting, with the electronic processor, a set of the plurality of performance metrics based on selection criteria, and (d) displaying the set of the plurality of performance metrics to an operator. The method may also include automatically repeating (a) through (d). In some embodiments, the method also includes, after the onboard operator stops operating the industrial machine, generating a report including at least one of the plurality of performance metrics. In some embodiments, the method also includes receiving a manual request for the report and generating the report in response to receiving the manual request.

Yet another embodiment of the invention provides a system for providing feedback to an operator of an industrial machine. The system includes a controller including an electronic processor. The electronic processor configured to monitor at least one operating parameter of the industrial machine, determine a plurality of performance metrics based on the at least one operating parameter, and select a subset of the plurality of performance metrics based on a selection criterion. The electronic processor is also configured to display the subset of the plurality of performance metrics to an operator of the industrial machine during operation of the industrial machine.

Another embodiment of the invention provides a method of providing feedback to an operator of an industrial machine. The method includes monitoring at least one operating parameter of the industrial machine based on data received from at least one sensor and determining a plurality of performance metrics based on the at least one operating parameter. The method also includes selecting, with an electronic processor, a subset of the plurality of performance metrics by comparing at least one of the plurality of performance metrics to a threshold, and, when the at least one of the plurality of performance metrics fails to satisfy the threshold, including the at least one of the plurality of performance metrics in the subset of the plurality of performance metrics. The method further includes displaying the subset of the plurality of performance metrics to the operator of the industrial machine during operation of the industrial machine, and selecting a new subset of the plurality of performance metrics when the at least one operating parameter changes.

A further embodiment of the invention provides non-transitory computer-readable medium including instructions that, when executed by an electronic processor, cause the electronic processor to perform a set of functions. The set of functions includes determining a plurality of performance metrics of an industrial machine based on at least one operating parameter of the industrial machine and selecting a subset of the plurality of performance metrics by comparing at least one of the plurality of performance metrics to a goal, and, when the at least one of the plurality of performance metrics fails to satisfy the goal, including the at least one of the plurality of performance metrics in the subset of the plurality of performance metrics. The set of functions also includes displaying the subset of the plurality of performance metrics to an operator of the industrial machine during operation of the industrial machine, and, when the at least one of the plurality of performance metrics satisfies the goal, removing the at least one of the plurality of performance metrics from the subset of the plurality of performance metrics.

Another embodiment provides a method for providing feedback to an operator of an industrial machine. The method includes monitoring at least one operating parameter of the industrial machine and determining, with an electronic processor, a plurality of performance metrics based on the at least one operating parameter. The method also includes providing at least one operational instruction to the operator of the industrial machine during operation of the industrial machine, the at least one operational instruction including an instruction for improving at least one performance metric included in the plurality of performance metrics.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, and the like.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more electronic processors, one or more memory modules including non-transitory computer-readable medium, one or more input/output interfaces, and various connections (for example, a system bus) connecting the components.

Figure 1:
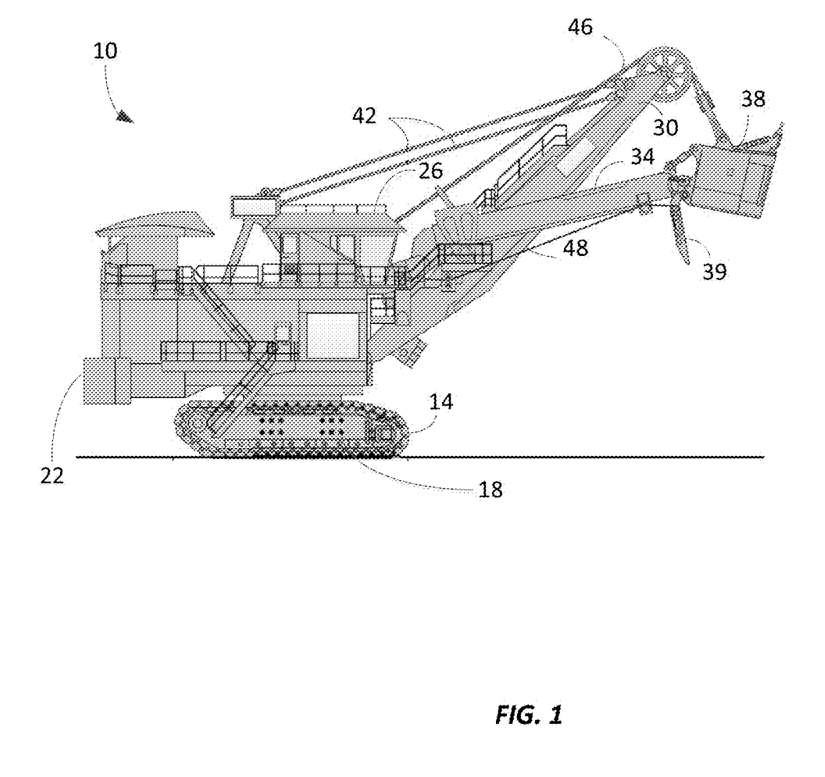
FIG. 1 illustrates an industrial machine.

FIG. 1 illustrates a mining shovel 10. It should be understood that although embodiments of the invention are described herein for a mining shovel, embodiments of the invention may be applied to or used in conjunction with a variety of industrial machines (for example, a rope shovel, a dragline, alternating current machines, direct current machines, hydraulic machines, and the like). The shovel 10 illustrated in FIG. 1 depicts an exemplary electric rope shovel. The shovel 10 includes left and right crawler shoes 14 (only the left crawler shoe 14 is illustrated in FIG. 1) for propelling the shovel 10 forward and backward and for turning the shovel 10 (for example, by varying the speed, direction, or both of the left and right crawler shoes 14 relative to each other). The crawler shoes 14 support a base 22 including a cab 26. In some embodiments, the base 22 is able to swing or swivel about a swing axis to move, for instance, between a digging location and a dumping location. In some embodiments, movement of the crawler shoes 14 is not necessary for the swing motion.

The shovel 10 also includes a boom 30 supporting a pivotable dipper handle 34 and a dipper 38. The dipper 38 includes a door 39 for dumping contents within the dipper 38. For example, during operation, the shovel 10 dumps materials contained in dipper 38 into a dumping location, such as the bed of a haul truck, a mobile crusher, a conveyor, an area on the ground, and the like.

As illustrated in FIG. 1, the shovel 10 also includes taut suspension cables 42 coupled between the base 22 and the boom 30 for supporting the boom 30. In some embodiments, in addition to or in place of one or more of the cables 42, the shovel 10 includes one or more tension members that connect the boom 30 to the base 22. The shovel 10 also includes a hoist cable 46 attached to a winch (not shown) within the base 22 for winding the cable 46 to raise and lower the dipper 38. The shovel 10 also includes a cable 48 attached to another winch (not shown) for opening and closing the dipper door 39. The shovel 10 may include a crowd pinion and a rack for extending and retracting the dipper 38.

The shovel 10 also includes one or more actuators for driving or operating the dipper 38. For an electric shovel, the one or more actuators may include one or more electric motors. For example, one or more electric motors may be used to operate the hoist cable 46 and the dipper trip cable 48. Similarly, one or more electric motors may be used to drive the bearing 18 and swing the base 22. A hydraulic shovel may similarly include one or more hydraulic actuators operated by hydraulic fluid pressure. For example, in some embodiments, the shovel 10 includes at least one hoist actuator for raising and lowering the dipper 38 and at least one crowd actuator for extending and retracting the dipper 38.

Figure 2:
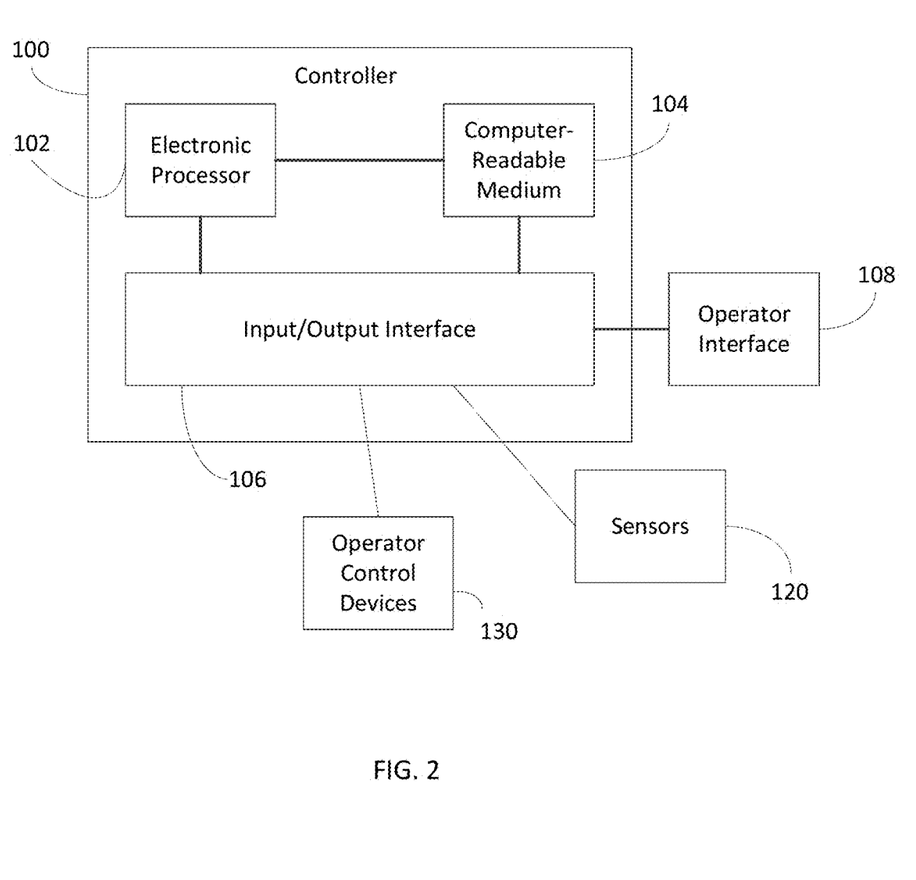
FIG. 2 schematically illustrates a controller for use with the industrial machine of FIG. 1.

A controller 100 associated with the shovel 10 is schematically illustrated in FIG. 2. The controller 100 may be included in the shovel 10 or may be located remote from the shovel 10. The controller 100 includes an electronic processor 102, a non-transitory computer-readable medium 104, and an input/output interface 106. The electronic processor 102, the computer-readable medium 104, and the input/output interface 106 communicate through one or more communication lines or buses. It should be understood that in other constructions, the controller 100 includes additional, fewer, or different components. Also, it should be understood that the controller 100 may perform additional functionality than the functionality described in the present application. Also, the functionality of the controller 100 described in the present application may be distributed among more than one controller.

The computer-readable medium 104 stores program instructions and data. The electronic processor 102 is configured to retrieve instructions from the computer-readable medium 104 and execute, among other things, the instructions to perform the control processes and methods described herein. The input/output interface 106 transmits data from the controller 100 to external systems, networks, and devices located on the shovel 10 or remote from the shovel 10 over one or more wired or wireless connections. The input/output interface 106 provides received data to the electronic processor 102 and, in some embodiments, may also store received data to the computer-readable medium 104.

In some embodiments, the controller 100 communicates with devices associated with the shovel 10 over one or more wired or wireless connections. For example, the controller 100 may be configured to communicate with an operator interface 108. The operator interface 108 may be included in the shovel 10 (for example, in the cab 26) or be included in a remote control or remote station used with the shovel 10. Also, in some embodiments, the operator interface 108 may include a device carried by the operator, such as a mobile telephone, watch, and the like, that includes a display for providing information to the operator. The operator interface 108 provides information to an operator currently operating the shovel 10, who may be onboard the shovel 10 or remote from the shovel 10. In some embodiments, the operator interface 108 also receives input from the operator for operating the shovel 10.

In some embodiments, the controller 100 also communicates with one or more sensors 120 associated with the shovel 10. In some embodiments, the sensors 120 are positioned on the shovel 10. The sensors 120 monitor various operating parameters of the shovel 10, such as the location and status of the dipper 38. For example, the controller 100 may communicate with one or more crowd sensors, swing sensors, hoist sensors, and shovel sensors. The crowd sensors indicate a level of extension or retraction of the dipper 38. The swing sensors indicate a swing angle of the dipper handle 34. The hoist sensors indicate a height of the dipper 38 (for example, based on a position of the hoist cable 46, the associated winch, or both). The shovel sensors may indicate a position of the dipper door 39, or may include weight sensors, acceleration sensors, inclination sensors, or a combination thereof, to provide additional information to the controller 100 about the load within the dipper 38.

In some embodiments, one or more of the sensors 120 are resolvers that indicate an absolute position or relative movement of an actuator (for example, a crowd motor, a swing motor, or a hoist motor). For instance, for indicating relative movement, as the hoist motor rotates to wind the hoist cable 46 to raise the dipper 38, hoist sensors may output a digital signal indicating an amount of rotation of the hoist and a direction of movement. The controller 100 may be configured to translate these outputs to a height position of the dipper 38, a speed of the dipper 38, an acceleration of the dipper 38, or a combination thereof. Of course, it should be understood that the sensors 120 may include other types of sensors in other embodiments. Also, it should be understood that, in some embodiments, one or more of the sensors 120 are included in the controller 100. Furthermore, it should be understood that the controller 100 may receive data from a sensors 120 directly or indirectly through another device, such as a separate controller associated with one or more of the sensors 120.

In some embodiments, the controller 100 also receives input from one or more operator control devices 130, such as joysticks, levers, foot pedals, and other actuators operated by the operator to control operation of the shovel 10. An operator may use the operator control devices 130 to issue commands, such as hoist up, hoist down, crowd extend, crowd retract, swing clockwise, swing counterclockwise, dipper door release, left crawler shoe 14 forward, left crawler shoe 14 reverse, right crawler shoe 14 forward, and right crawler shoe 14 reverse.

As noted above, in some embodiments, the controller 100 is located remote from the shovel 10. When the controller 100 is located remote from the shovel 10, the controller 100 may be configured to communicate with the operator interface 108, the sensors 120, and the operator control devices 130 wirelessly (for example, through a transceiver) over one or more communication networks (for example, a local area network or the Internet). For example, the controller 100 may be configured to wirelessly receive data from the sensors 120 and wirelessly transmit data to the operator interface 108.

As noted above, the electronic processor 102 is configured to retrieve instructions from the computer-readable medium 104 and execute, among other things, the instructions to perform control processes and methods for the industrial machine. For example, the controller 100 (in particular, the electronic processor 102) is configured to perform the method 200 illustrated in FIG. 3 to provide feedback to an operator of the shovel 10 during operation of the industrial machine.

Figure 3:
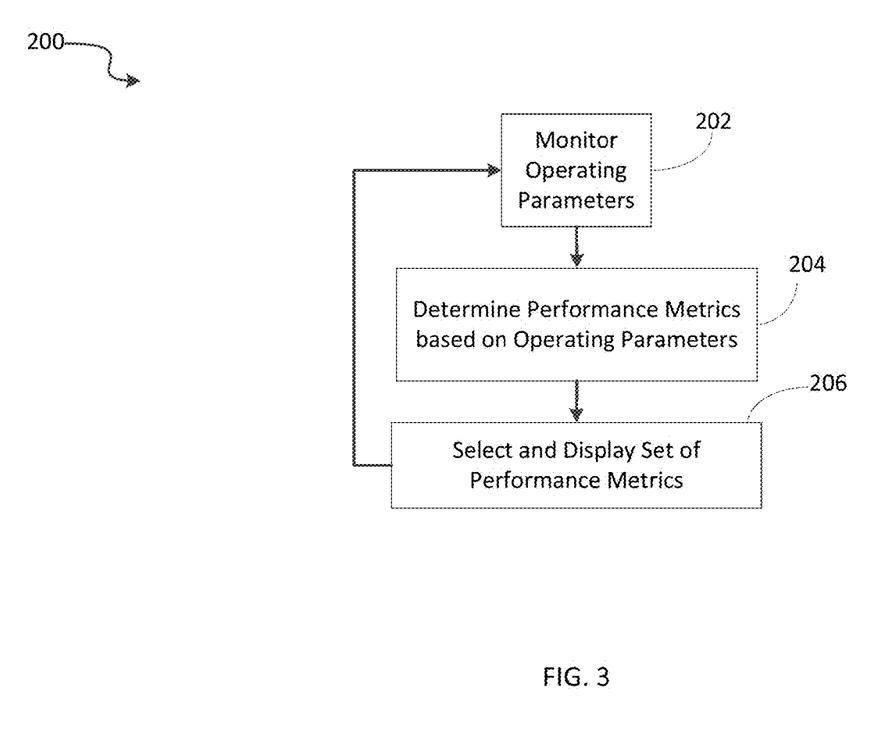
FIG. 3 is a flow chart illustrating a method performed by the controller of FIG. 2 for providing feedback to an operator of an industrial machine.

As illustrated in FIG. 3, the controller 100 is configured to monitor at least one operating parameter of the shovel 10 during operation of the shovel 10 (at block 202). The operating parameters may include a motion speed (for example, a hoist speed, a crowd speed, a swing speed, and the like), a current dig cycle, a dipper load, a dipper position, a boom position, a cycle time, a cycle type, a payload, a production rate, a production total, a utilization delay, an operating delay, a count of practices (for example, dipper strikes, boom jacks, stalls, swings-in-bank, swing impacts, and the like), a digging location (for example, a distance from a bank), a swing angle, or a combination thereof. The operating parameters may represent current parameters, aggregate parameters, such as average values, minimum values, maximum values, first order values, second order values, and the like, or a combination thereof. For example, the operating parameters may include a first order statistic representing a smallest or minimum value over a period of time, a second order statistics representing a second smallest value over a period of time, or the like. The controller 100 may access data collected from the operator interface 108, the sensors 120, the operator control devices 130, or a combination thereof to monitor the operating parameters.

As illustrated in FIG. 3, the controller 100 is also configured to determine a plurality of performance metrics for the shovel 10 based on the monitored operating parameters (at block 204). The plurality of performance metrics may include a structural life of the shovel 10, a mechanical life of the shovel 10, an electrical life of the shovel 10, a productivity of the shovel 10 or the operator, a cycle time, a payload or a distribution of payload, a production rate of the shovel 10 or the operator, a production total of the shovel 10 or the operator, a utilization delay, an operating delay, a count of practices (for example, boom jacks, stalls, swingsin-bank, and the like), an angle of digging relative to machine geometry, an average swing angle, a production remaining to target, a comparison of current performance to historical performance, and the like or a combination thereof. For example, the plurality of performance metrics may include a current statistic, such as a production total, as compared to a previous shift, a best shift, a month average, and the like. Similarly, the plurality of performance metrics may include a comparison of a current sub-cycle phase time to a historical average, best performance, or both. The plurality of performance metrics may also include any of the above metrics normalized (for example, by computation of life or duty). It should be understood that the plurality of performance metrics may be based on current operating parameters, historical operating parameters, or a combination thereof. For example, as noted above, in some embodiments, a performance metric may measure (for example, average) a particular metric over a predetermined time period, such as the last five or ten minutes. In other embodiments, a performance metric may measure a current metric (for example, a current load in the dipper 38). Also, in some embodiments, the plurality of performance metrics may include an identification of an opportunity to improve cycle time.

After determining the plurality of performance metrics, the controller 100 selects all or a subset of the plurality of performance metrics (referred to herein as an "active subset") to display to an operator during operation of the shovel 10 (at block 206). In some embodiments, the controller 100 selects a subset of the plurality of performance metrics (for example, two to three performance metrics) to avoid overloading the operator with too much information at one time. However, in other embodiments, the controller 100 may select all of the plurality of performance metrics to display to the operator. Regardless of whether the controller 100 selects all or a subset of the plurality of performance metrics, the controller 100 may order the selected performance metrics for display (simultaneously or serially).

When the controller 100 selects a subset of the plurality of performance metrics, the controller may perform this selection based on at least one selection criterion. In some embodiments, the selection criterion includes a decision tree. For example, the controller 100 may be configured to use a decision tree that identifies performance metrics representing the biggest opportunity for improvement. Similarly, the selection criterion may include a preset hierarchy of precedence (ranking) for the importance of various performance metrics (for example, whether current cycle time is more or less important than monthly average cycle time). Alternatively or in addition, the selection criterion may include one or more thresholds. For example, the controller 100 may select the active subset (or a portion thereof) by comparing one or more of the plurality of performance metrics to one or more thresholds. In some embodiments, when a metric (or a combination of metrics) fails to satisfy a threshold or fails to approach a threshold over a predetermined period of time, the controller 100 may add one or more metrics, such as the failing metric, to the active subset. Similarly, in some embodiments, the controller 100 may be configured to add one or more metrics to the active subset that fail an associated threshold by the greatest amount (for example, the worst performance metrics). Also, in some embodiments, the selection criterion may include one or more rules. These rules may be stored in the computer-readable medium 104 and, in some embodiments, may be generated and customized for a particular operator, industrial machine, mine, and the like (for example, based on original equipment manufacturer ("OEM") input, customer weighting, mine planning, production plans, and the like). Accordingly, the controller 100 may select an active subset based on an identity of the operator of the shovel 10 to provide an active subset that is personally tailored for the operator.

In some embodiments, the controller 100 uses one or more performance goals associated with the operator's current operation of the shovel 10 to generate the performance metrics, select the active subset, or both. For example, in some embodiments, the controller 100 uses the monitored operating parameters to estimate whether a performance goal, including but not limited to a production goal, will be satisfied. The controller 100 may provide this information to the operator as a performance metric included in the active subset or separate from the active subset. For example, the controller 100 may generate and display a green or red icon indicating whether the performance goal will likely be satisfied. In some embodiments, the controller 100 may also use a performance goal to provide a goal-to-go metric as one of the performance metrics. This metric may indicate an amount of production remaining to achieve a production goal (for example, 10% of goal production remaining) and, in some embodiments, may indicate a level of production needed to satisfy the production goal (for example, for a predetermined work cycle or time, such as an operator's assigned shift). In addition, in some embodiments, after a performance goal is satisfied, the controller may modify the selection of performance metrics to focus on other operating goals, such as saving industrial machine life by reducing component wear, reducing cycle time, managing payload, or the like.

In addition to or as an alternative to displaying the active subset, the controller 100 may be configured to generate and provide one or more operational instructions ("coaching cues"). The coaching cues may correspond to the performance metrics displayed in the active subset and may provide instructions for improving one or more performance metrics included in the active subset. A coaching cue may be visual, tactile, audible, or a combination thereof. For example, a coaching cue may be provided as a flashing or changing lights, as textual or graphical instructions, such as displaying a desired path of the dipper 38 or another component of the shovel 10, as vibration provided through a vibrating joystick or seat to alert the operator when the shovel 10 has or has not be properly operated for a current task, or as alarms, tones, verbal instructions, and the like. Accordingly, the coaching cues may be provided to an operator through the operator interface 108, a heads-up display, buzzers, vibrating features in a seat or a joystick, a force feedback joystick, warning lights, holographic displays, and the like. For example, when the operator repeatedly stalls in a bank while digging, the controller 100 may display (for example, through the operator interface 108) a red arrow indicating that the operator needs to pull back on the crowd motion to prevent the stall condition from occurring. Additionally, the joystick of the industrial machine may provide the operator tactile feedback to inform the operator that the machine is performing a task in an unproductive manner. Thus, in some embodiments, the controller 100 provides the coaching cues to the operator along with the performance metrics to not only inform the operator of current performance of the shovel 10 but also to help improve the operation of the shovel 10.

As illustrated in FIG. 3, in some embodiments, the controller 100 repeatedly (for example, continuously, at a predetermined frequency, or in response to particular events)

monitors the operating parameters, determines the performance metrics, and selects the active subset (and any corresponding coaching cues). Accordingly, as the performance of the shovel 10 changes, the feedback provided to the operator also changes. For example, when an active subset includes a particular performance metric that indicates inefficient operation of the shovel 10 but the operator changes operation of the shovel 10 to address this inefficiency, the controller 100 may eventually remove the performance metric from the active subset (as the performance metric begins to indicate efficient operation or at least improvement over past performance). For example, in some embodiments, when a performance metric improves by a predetermined percentage over a predetermined period of time, the controller 100 may remove the performance metric from the active subset. With that performance metric removed from the active subset, the controller 100 may include a different performance metric in the active subset. It should be understood that, in some embodiments, the controller 100 may remove a performance metric from the active subset for reasons unrelated to changes in the performance metric. For example, when a particular period of time has passed with little no change to the performance metric (or no positive change), the controller 100 may be configured to remove the performance metric from the active subset, which may allow the controller 100 to provide a different performance metric that the operator may respond to better or is easier to address.

As noted above, in some embodiments, the controller 100 may be configured to update the displayed active subset in response to a detected event. For example, the controller 100 may be configured to update the displayed active subset in response to sensing a change in operation or utilization of the shovel 10. When the controller 100 senses such a change, the controller 100 may determine one or more of the plurality of performance metrics (based on current operating parameters of the shovel 10) and update the active subset accordingly. For example, when the industrial machine is in a high production environment, the controller 100 may focus the active subset and any associated coaching cues on improved performance. However, when the industrial machine is underutilized, the controller 100 may focus the active subset and any associated coaching cues on higher efficiency, less damage, and other items that affect the health of the industrial machine.

In some embodiments, the controller 100 is also configured to generate a report. For example, after the operator's shift is complete and the operator stops operating the shovel 10, the controller 100 may generate a report for the operator. The report may include one or more of the plurality of performance metrics. The metrics may include metrics averaged over a predetermined period of time (for example, the operator's shift), minimum or maximum metric values determined during the predetermined period of time, or a combination therefore. The report may also include information indicating whether the operator satisfied the planned performance, such as planned production (for example, for a shift). The report may be provided through the operator interface 108, another interface, or a combination thereof. Also, in some embodiments, the report may be printed.

In some embodiments, the controller 100 is also configured to provide a plurality of reports. The plurality of reports may include previous reports for the operator (for example, reports associated with previous shifts). Alternatively or in addition, the plurality of reports may include reports for other operators (for example, operators of the same or similar shovels or other shovels within the same mine). For example, the controller 100 may be configured to access a plurality of reports (for example, stored on a server external to the controller 100) and generate one or more user interfaces that the operator may navigate to select and view an available report. The reports may relate to a single operator, a group of operators, a group of machines, or a combination thereof.

Providing the plurality of reports allows an operator to see how the operator's performance compares to other operators within the same mine or different mines. Also, in some embodiments, the controller 100 may be configured to use the information from one or more of the plurality of report when selecting performance metrics to include in the active subset. For example, when the controller 100 determines a performance metric that varies by a predetermined amount or percentage from similar operators and similar industrial machines (for example, fails to satisfy an average of the performance metrics for similar operators and similar industrial machines), the controller 100 may include the performance metric in the active subset to alert the operator of the poor performance along with optional coaching cues for rectifying the underperformance.

In some embodiments, the controller 100 is configured to automatically generate the report at the end of the operator's shift. For example, the controller 100 may be configured to detect when operation of the shovel 10 ends (for example, based on information from the sensors 120) or may be configured to detect when the operator's shift is over based on calendar data or other schedule information. In some embodiments, the controller may also generate a report on-demand in response to receiving user input representing a manual request initiated by the operator or other personnel (for example, the operator's supervisor).

Various features and advantages of the invention are set forth in the following claims.

What is claimed is:

1. A method for providing feedback to an operator of an industrial machine, the method comprising:
   repeatedly monitoring, during operation of the industrial machine by the operator using data collected by one or more sensors, at least one operating parameter of the industrial machine;
   repeatedly determining, with an electronic processor during the operation of the industrial machine, a plurality of performance metrics based on the at least one operating parameter;
   repeatedly selecting a subset of the plurality of performance metrics based on an opportunity to improve performance associated with each of the plurality of performance metrics; and
   repeatedly providing, to the operator of the industrial machine during the operation of the industrial machine via an operator interface, the subset of the plurality of performance metrics.

2. The method of claim 1, wherein providing the at least one operational instruction to the operator of the industrial machine includes providing at least one selected from a group consisting of a visual instruction, a tactile instruction, and an audible instruction.

3. The method of claim 1, wherein providing the at least one operational instruction to the operator of the industrial machine includes providing at least one selected from a group consisting of an instruction to stop movement of at least one component of the industrial machine and an instruction to change movement of at least one component of the industrial machine.

4. The method of claim 1, wherein providing the at least one operational instruction to the operator of the industrial machine includes providing a desired path of at least one component of the industrial machine.

5. The method of claim 1, wherein monitoring the at least one operating parameter of the industrial machine includes monitoring at least one selected from a group consisting of a motion speed, a current dig cycle, a dipper load, a dipper position, a boom position, a cycle type, a payload, a production rate, a production total, a delay, and a digging location.

6. The method of claim 1, wherein determining the plurality of performance metrics based on the at least one operating parameter includes determining at least one selected from a group consisting of a structural life, a mechanical life, an electrical life, a productivity, a cycle time, a payload, a production rate, a production total, a utilization, a delay, a count of a practice, an average swing angle, a production remaining to a target, and a comparison of a current performance to a historical performance.

7. The method of claim 1, wherein selecting the subset of the plurality of performance metrics further includes comparing at least one of the plurality of performance metrics to a threshold and including the at least one of the plurality of performance metrics in the subset of the plurality of performance metrics when the at least one of the plurality of performance metrics fails to satisfy the threshold.

8. The method of claim 1, wherein selecting the subset of the plurality of performance metrics further includes comparing at least one of the plurality of performance metrics to a threshold and including the at least one of the plurality of performance metrics in the subset of the plurality of performance metrics when the at least one of the plurality of performance metrics fails to approach the threshold over a predetermined period of time.

9. The method of claim 1, wherein selecting the subset of the plurality of performance metrics further includes selecting the subset of the plurality of performance metrics using a decision tree.

10. The method of claim 1, wherein selecting the subset of the plurality of performance metrics further includes selecting the subset of the plurality of performance metrics using a preset hierarchy of precedence of the plurality of performance metrics defines a ranking of the plurality of performance metrics based on importance.

11. The method of claim 1, wherein selecting the subset of the plurality of performance metrics further includes selecting the subset of the plurality of performance metrics based on at least one performance goal for the industrial machine.

12. The method of claim 11, wherein determining the plurality of performance metrics based on the at least one operating parameter includes determining an amount of production remaining to achieve the at least one performance goal.

13. The method of claim 11, further comprising selecting a new subset of the plurality of performance metrics when the at least one performance goal is satisfied.

14. The method of claim 1, wherein selecting the subset of the plurality of performance metrics further includes selecting the subset of the plurality of performance metrics based on an identity of the operator.

15. The method of claim 1, wherein repeatedly selecting the subset of the plurality of performance metrics includes selecting a new subset of the plurality of performance metrics based on the plurality of performance metrics updated when the least one operating parameter changes.

16. The method of claim 1, further comprising generating a report including at least one of the plurality of performance metrics, wherein the electronic processor is configured to generate the report in response to at least one selected from a group consisting of receiving user input representing a request for the report and detecting an end of the operation of the industrial machine.

17. The method of claim 1, further comprising generating a report for the operation of the industrial machine occurring over a period of time, the report including at least one of the plurality of performance metrics, wherein the at least one of the plurality of performance metrics includes at least one selected from a group consisting of an average value over the period of time, a minimum value over the period of time, and a maximum value over the period of time.

18. A system for providing feedback to an operator of an industrial machine, the system comprising:
 a controller including an electronic processor configured to
  monitor at least one operating parameter of the industrial machine during operation of the industrial machine by the operator based on data received from at least one sensor,
  determine a plurality of performance metrics based on the at least one operating parameter,
  select a subset of the plurality of performance metrics based on an identity of the operator,
  display, via an operator interface, the subset of the plurality of performance metrics to the operator of the industrial machine during the operation of the industrial machine, and
  select a new subset of the plurality of performance metrics when the at least one operating parameter changes.

19. Non-transitory computer-readable medium including instructions that, when executed by an electronic processor, cause the electronic processor to perform a set of functions, the set of functions comprising:
 determining a plurality of performance metrics of an industrial machine during operation of the industrial machine by an operator based on at least one operating parameter of the industrial machine;
 selecting a subset of the plurality of performance metrics by
  comparing at least one of the plurality of performance metrics to a goal, and
  when the at least one of the plurality of performance metrics fails to satisfy the goal, including the at least one of the plurality of performance metrics in the subset of the plurality of performance metrics;
 displaying, via an operator interface, the subset of the plurality of performance metrics to the operator of the industrial machine during the operation of the industrial machine; and
 when the at least one of the plurality of performance metrics satisfies the goal, removing the at least one of the plurality of performance metrics from the displayed subset of the plurality of performance metrics.

* * * * *